(No Model.)

S. E. SHUTE & J. C. ALBRIGHT.
STOVE PIPE FASTENING.

No. 274,835. Patented Mar. 27, 1883.

Witnesses,
John S. Deal

Inventors
Samuel E. Shute
Jonas C. Albright
by W. J. Dennis
their Attorney

UNITED STATES PATENT OFFICE.

SAMUEL E. SHUTE AND JONAS C. ALBRIGHT, OF RICHMOND, INDIANA, ASSIGNORS OF ONE-THIRD TO JOSEPH S. ZELLER.

STOVE-PIPE FASTENING.

SPECIFICATION forming part of Letters Patent No. 274,835, dated March 27, 1883.

Application filed January 20, 1883. (No model.)

*To all whom it may concern:*

Be it known that we, SAMUEL E. SHUTE and JONAS C. ALBRIGHT, citizens of the United States, residing at Richmond, in the county of Wayne and State of Indiana, have invented certain new and useful Improvements in Stove-Pipe Fastenings, of which the following is a specification, reference being had therein to the accompanying drawings.

Our invention relates to a device which is attached to outside surface of a stove-pipe, by means of which the pipe may be firmly held to its position in a chimney-flue or may be released at pleasure.

Our invention consists in the employment of two metallic straps or springs inserted in and attached to the body of the pipe, on the outside of the same, each encircling the pipe in opposite directions spirally, where the ends of the said straps or springs are attached to a vibrating arm pivoted at its center to the body of the pipe, the vibrations of the arms serving to contract or expand the area of the circumference of the straps or springs, the expansion of which, by the pressure of a cam operating at one end of the arm, creates a contact between the strap or spring and the inner surface of the chimney-flue, and the pipe is held in place by the pressure exerted by the cam-arm and spring or strap at the point of contact.

Figure 1:
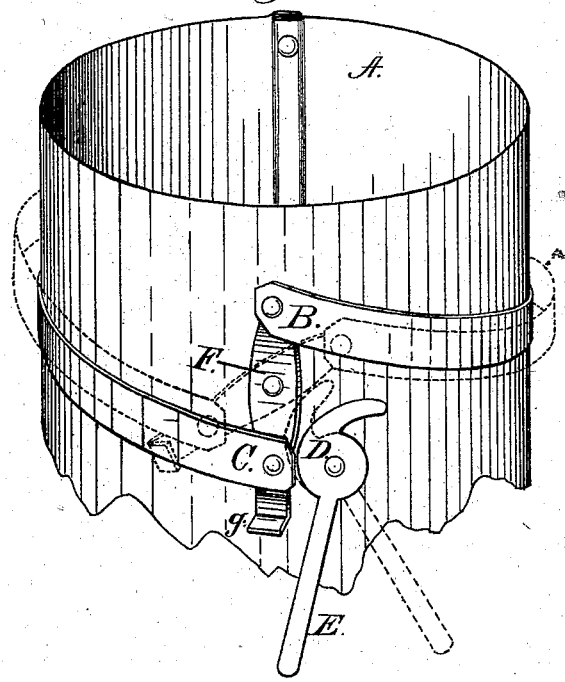
Figure 2:
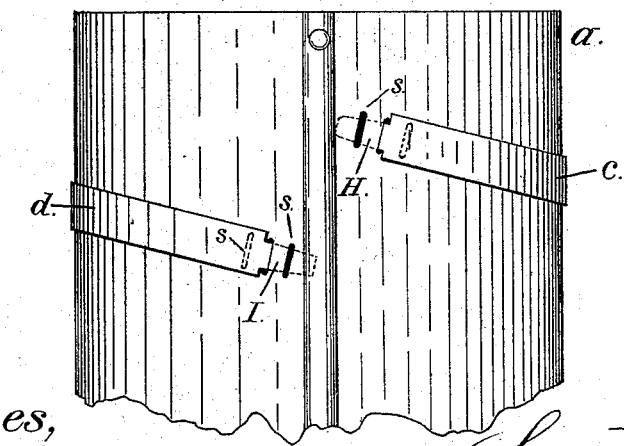

In the drawings, Figure 1 shows a section of pipe with the fastening devices attached. Fig. 2 is a view of the reverse side of the pipe, showing the manner of connecting the fastening devices with and to the pipe.

In Fig. 1, A represents a stove-pipe of the ordinary construction. B and C are metallic straps, which encircle the pipe at an angle, the ends of which are secured to the opposite ends of arm F. The arm F, at its center, is pivoted to the pipe, by which it is allowed a vibratory motion. D is a cam attached to a lever, E, by which it is operated. The face of the cam D works against the arm F, at or near the point where the strap C is attached to the arm, and when the cam D is operated by the lever E the straps C and B are thrown out from the surface of the pipe, as is shown in the dotted lines in Fig. 1. The end of the arm F is turned up at right angles, forming a catch or projection, g, which serves to prevent the stove-pipe from entering the flue farther than desired.

In Fig. 2, c and d represent the rear ends of the straps, which are attached to the pipe a by means of longitudinal slots formed in the pipe, as shown at s s, Fig. 2, through which the ends of the straps formed into tenons H I pass, terminating on the inside of the pipe a. The tenons H I are provided with shoulders where they are formed from the straps, which said shoulders rest against the ends of the slots s s and prevent an endwise movement of the straps when pressed by the cam D.

When the pipe is inserted in the chimney-flue, with the straps B and C in contact with the circumference of the pipe, as shown in Fig. 1, it is arrested at the desired point by the lug or projection g, when the lever E is moved to operate the cam D, which, by means of the arm F, carries the ends of the straps B and C back and from each other, and extending them outwardly, as shown by the dotted lines, when they are brought in contact with the inner surface of the chimney-flue, and thus holding the pipe firmly by the pressure, which may be increased or diminished by the operation of the cam.

By providing two or more slots the straps may be taken out and replaced, allowing greater or less expansion of the straps, and thus accommodating the pipe and its fastener to chimney-flues of different sizes.

Having thus fully described our said improvement, what we claim as new, and desire to secure by Letters Patent, is—

Attached to and combined with a stove-pipe, the removable and adjustable straps B C, connected with the arm F, and operated by the cam D, substantially as set forth.

In testimony whereof we affix our signatures in presence of two witnesses.

SAMUEL E. SHUTE.
JONAS C. ALBRIGHT.

Witnesses:
W. I. DENNIS,
CHARLES J. GEIER.